United States Patent
Seitz et al.

(10) Patent No.: US 10,586,320 B2
(45) Date of Patent: Mar. 10, 2020

(54) METHOD FOR CORRECTING A PREDETERMINED CUTTING PATH FOR CUTTING A SHEET METAL BLANK

(71) Applicant: SCHULER AUTOMATION GMBH & CO. KG, Hessdorf (DE)

(72) Inventors: Alexander Seitz, Erlangen (DE); Jan-Peter Grosse, Moehrendorf (DE)

(73) Assignee: SCHULER PRESSEN GMBH, Hessdorf (DE)

( * ) Notice: Subject to any disclaimer, the term of this patent is extended or adjusted under 35 U.S.C. 154(b) by 109 days.

(21) Appl. No.: 15/552,734

(22) PCT Filed: Apr. 25, 2016

(86) PCT No.: PCT/EP2016/059202
§ 371 (c)(1),
(2) Date: Aug. 22, 2017

(87) PCT Pub. No.: WO2016/135350
PCT Pub. Date: Sep. 1, 2016

(65) Prior Publication Data
US 2018/0047151 A1   Feb. 15, 2018

(30) Foreign Application Priority Data

Feb. 23, 2015   (DE) .......................... 10 2015 203 221

(51) Int. Cl.
*G06T 7/00* (2017.01)
*B23K 26/08* (2014.01)
(Continued)

(52) U.S. Cl.
CPC ........ *G06T 7/0004* (2013.01); *B23K 26/0846* (2013.01); *B23K 26/38* (2013.01);
(Continued)

(58) Field of Classification Search
CPC ..................... G06T 7/0004; G06T 7/70; G06T 2207/30136; G06T 2207/30204;
(Continued)

(56) References Cited

U.S. PATENT DOCUMENTS 4,047,457 A * 9/1977 Stubbings .............. B23D 33/04
83/76.8
5,134,911 A * 8/1992 Busky .................... B26D 5/005
83/34
(Continued)

FOREIGN PATENT DOCUMENTS

DE   10 2007 042 165 A1   2/2009
DE   10 2013 203 384 A1   8/2014
(Continued)

OTHER PUBLICATIONS

PCT/ISA/210, "International Search Report for PCT/EP2016/059202", dated Aug. 19, 2016.
(Continued)

*Primary Examiner* — Xuemei G Chen
(74) *Attorney, Agent, or Firm* — Manabu Kanesaka (57) ABSTRACT

The invention relates to a method for correcting a predetermined cutting path for cutting a metal blank from a metal strip continuously transported in a transport direction x with the following steps:
Simultaneously determining a first x coordinate x1 and a first y coordinate y1 of a point on a surface of the metal strip with respect to an x and a y reference;
Determining a second coordinate y2 of the point with respect to the y reference at precisely the time when the metal strip has been moved in the transport direction x by a predetermined first distance dx1 with respect to the first x coordinate x1;
Determining a first y correction value $K_y1$ by taking the difference between the first y coordinate y1 and the second y coordinate y2; and
(Continued)

Using the first y correction value $K_y1$ to correct the cutting path coordinates describing the predetermined cutting path.

14 Claims, 5 Drawing Sheets

(51) Int. Cl.
  *B23K 26/38* (2014.01)
  *G05B 19/402* (2006.01)
  *G01B 11/04* (2006.01)
  *G06T 7/70* (2017.01)
  *G01B 11/00* (2006.01)

(52) U.S. Cl.
  CPC .......... *G01B 11/002* (2013.01); *G01B 11/04* (2013.01); *G05B 19/402* (2013.01); *G06T 7/70* (2017.01); *G05B 2219/37593* (2013.01); *G05B 2219/50062* (2013.01); *G06T 2207/30136* (2013.01); *G06T 2207/30204* (2013.01)

(58) Field of Classification Search
  CPC ........ G05B 19/402; G05B 2219/37593; G05B 2219/50062; G01B 11/04; G01B 11/002; B23K 26/0846; B23K 26/38
  USPC .......... 72/324, 337; 83/76.8, 34, 49, 74, 84, 83/100, 375, 422; 219/121.67, 121.72; 409/80; 700/130
  See application file for complete search history.

(56) References Cited

U.S. PATENT DOCUMENTS

| | | | | |
|---|---|---|---|---|
| 5,421,185 A * | 6/1995 | Castricum | ............ | B23D 19/065 |
| | | | | 72/324 |
| 5,727,433 A * | 3/1998 | Pomerleau | ............... | B26D 5/00 |
| | | | | 700/130 |
| 6,152,003 A * | 11/2000 | Jung | ........................ | B26D 7/20 |
| | | | | 83/74 |
| 6,308,602 B1 * | 10/2001 | Gerber | ..................... | B26D 5/00 |
| | | | | 83/100 |
| 7,176,408 B2 * | 2/2007 | Schulz | ................... | B23K 26/04 |
| | | | | 219/121.72 |
| 8,253,064 B2 * | 8/2012 | Beck | .................. | B23K 26/0846 |
| | | | | 219/121.67 |
| 8,790,064 B2 * | 7/2014 | Dorner | ................. | B21D 43/003 |
| | | | | 198/345.1 |
| 8,923,656 B1 * | 12/2014 | Yokoyama | ......... | G05B 19/4205 |
| | | | | 382/309 |
| 9,415,467 B2 * | 8/2016 | Liebel | ................ | B23K 26/0846 |
| 10,456,877 B2 * | 10/2019 | Marchal | ................... | B29B 11/16 |
| 2001/0037710 A1 * | 11/2001 | Kuchta | ..................... | B65H 9/08 |
| | | | | 83/84 |
| 2001/0045148 A1 * | 11/2001 | Gerent | ..................... | B26D 5/00 |
| | | | | 83/49 |
| 2003/0034336 A1 * | 2/2003 | Erlenmaier | ............ | B23K 26/06 |
| | | | | 219/121.72 |
| 2012/0247297 A1 * | 10/2012 | Kawaguchi | ............ | B26D 5/005 |
| | | | | 83/375 |
| 2013/0156522 A1 * | 6/2013 | Magnuson | ............. | B23Q 15/22 |
| | | | | 409/80 |
| 2013/0247736 A1 * | 9/2013 | Niizeki | ................ | B26D 7/0006 |
| | | | | 83/422 |
| 2015/0190883 A1 * | 7/2015 | Erlwein | ............. | B23K 26/0846 |
| | | | | 219/121.72 |
| 2015/0360324 A1 * | 12/2015 | Erlwein | ............. | B23K 26/0846 |
| | | | | 219/121.72 |
| 2016/0136715 A1 * | 5/2016 | Liebel | .................. | B21D 35/001 |
| | | | | 72/337 |

FOREIGN PATENT DOCUMENTS

| | | |
|---|---|---|
| EP | 0 474 034 A1 | 3/1992 |
| WO | 2009/105608 A1 | 8/2009 |

OTHER PUBLICATIONS

PCT/ISA/237, "Written Opinion of the International Searching Authority for PCT/EP2016/059202."

* cited by examiner

METHOD FOR CORRECTING A PREDETERMINED CUTTING PATH FOR CUTTING A SHEET METAL BLANK

RELATED APPLICATIONS

The present application is National Phase of International Application No. PCT/EP2016/059202 filed Apr. 25, 2016, and claims priority from German Application No. 10 2015 203 221.3, filed Feb. 23, 2015, the disclosure of which is hereby incorporated by reference herein in its entirety.

The invention relates to a method for correcting a predetermined cutting path for cutting a metal blank from a metal strip continuously transported in a transport direction.

DE 10 2013 203 384 A1 discloses a method for correcting a predetermined cutting path for cutting, by means of a laser cutting apparatus, a metal blank from a metal strip continuously transported in a transport direction or an x-direction. The cutting path is defined by multiple successive cutting path coordinates in a cutting program. To correct the cutting path, deviations of the strip edge in the y direction are continuously measured by means of two strip edge measurement devices arranged one after the other in a transport direction. On the basis of the deviations measured in the y direction, the cutting path coordinates are then corrected. Furthermore, fluctuations in the transport velocity can be detected by means of a displacement measurement device and taken into consideration in the correction of the cutting path coordinates.

In the known method, it is tacitly assumed that the edge of the metal strip runs straight. However, in practice this is not the case. In reality, the edge of the metal strip has a waviness with a first wavelength in the range from a few centimeters up to several meters, or corresponding unevenness. Furthermore, the edge of the strip can have a so-called bowing, or longitudinal curvature, whose radius of curvature is usually greater than 100 m.—In particular, in the known method the aforementioned waviness of the strip edge has the result that the distances measured in the y direction do not exactly represent the actual deviation of a median line of the metal strip from a predetermined y reference. Consequently, the correction of the cutting path coordinate is not always sufficient. In the case of a contour made of multiple partial sections, this can have the result that the ends of the respective partial sections do not exactly match or transition into one another.

Another method for correcting a cutting path for cutting a metal blank is disclosed in WO 2009/105608. This involves putting marks on a top of the metal strip, this top facing a laser cutting apparatus. The marks are detected by means of a camera mounted above the metal strip. Comparison of the successive pictures determines a deviation of the marks in a y direction and thus a deviation of the median line of the metal strip from a y reference. The determined deviation in the y direction is used to correct the cutting path.—In the known method, the accuracy of the correction depends on the quality of the marks put onto the metal strip. These marks are usually sprayed-on paint dots, which in practice have an irregular perimeter from time to time. This can lead to inaccuracies in the determination of the deviations of the metal strip in the y direction. Furthermore, it can also happen that sprayed-on paint dots do not properly adhere to the surface of the metal strip, which can interrupt and substantially disturb a correction of the cutting path coordinates. Finally, after the metal blanks are cut, the paint dots sprayed onto the metal strip must be removed, which takes a lot of effort, since they interfere with a later spray painting of the metal blank.

The goal of the invention is to eliminate the disadvantages of the prior art. In particular, the goal is to indicate a method that allows an especially exact correction of a cutting path on a continuously moved metal strip.

This is accomplished by the features of claims 1 and 5. Expedient embodiments of the invention follow from the features of claims 2 through 4 and 6 through 12.

A first aspect of the invention proposes a method for correcting a predetermined cutting path for cutting a metal blank from a metal strip continuously transported in a transport direction x, with the following steps:

Simultaneously determining a first x coordinate x1 and a first y coordinate y1 of a point on a surface of the metal strip with respect to an x and a y reference;

Determining a second coordinate y2 of the point with respect to the y reference at precisely the time when the metal strip has been moved in the transport direction x by a predetermined first distance dx1 with respect to the first x coordinate x1;

Determining a first y correction value $K_y1$ by taking the difference between the first y coordinate y1 and the second y coordinate y2; and Using the first y correction value $K_y1$ to correct the cutting path coordinates describing the predetermined cutting path.

According to the invention, an arbitrary point on the surface of the metal strip is detected. For example, it can be a point on the edge of the metal strip. In departure from the prior art, the detection of the point involves detecting its first positional coordinates x1y1, and doing so with respect to an x- and a y-reference. If the metal strip has been moved in a transport direction x by a predetermined distance dx1, second positional coordinates x2y2 of the same point are detected, which is done with respect to the y reference. The x reference follows from, for example, from the fixed predetermined first distance dx1.

Inventively observing the change in position of a point on the surface of the metal strip, this point being defined by first positional coordinates x1y1, can avoid the inaccuracies of the method known from the prior art. In particular, carrying out the inventive method does not require putting a separate mark on the metal strip. The proposed method provides precise corrections even when the y coordinates are determined at an edge of the metal strip that is uneven.

The inventive method can correct cutting paths for cutting a metal blank exactly enough that the ends of partial sections surrounding the blank exactly transition into one another. It is possible to dispense with finishing the blank in the area of overlapping ends of partial sections.

According to an advantageous embodiment of the invention, the method comprises the following other steps:

Providing a first y measurement device to measure the first y coordinate y1 of the metal strip with respect to the y reference;

Providing a second y measurement device to measure the second y coordinate y2 of the metal strip with respect to the y reference, the second y measurement device being arranged at the predetermined first distance dx1 downstream of the first y measurement device; and Providing a first displacement measurement device to measure the x coordinates of the metal strip with respect to the x reference.

The first and the second y measurement devices are advantageously measuring devices that make it possible to measure a distance of the strip edge from a y reference. It is expedient to use structurally identical measuring devices as the first and second y measurement devices. The y measurement devices can be conventional measuring devices to detect the position of a strip edge. Preferably, optical measuring devices are used to accomplish this. The first displacement measurement device is advantageously a mechanical displacement sensor with a measuring wheel that lies against the metal strip. This allows detection of the exact travel covered by the metal strip, in particular an offset of the metal strip by the first distance dx1. This allows measurement of the second y coordinate with the second measuring device exactly when the metal strip is located the first distance dx1 downstream of the first y measurement device.

According to another advantageous embodiment of the first aspect of the inventive method comprises the following other steps:

Determining a third y coordinate y3 at a predetermined second distance dx2 from the place of determination of the second y coordinate y2;

Determining a second y correction value $K_y2$ by taking the difference between the second y2 y coordinate and the third y coordinate y3; and Correcting the cutting path coordinates describing the predetermined cutting path by taking into consideration a change in the second y correction value $K_y2$ with respect to the first y correction value $K_y1$ over the transport path or over time.

According to the proposed embodiment, another change in the position of the observed point on the metal strip is observed downstream of the second y measurement device. At the place of the observation, the position of the point is defined by third positional coordinates x3y3. Comparison of the first positional coordinates x1y1, the second positional coordinates x2y2, and the third positional coordinates x3y3 makes it possible to infer whether the metal strip is bowed and, if this is the case, how large the radius of the longitudinal curvature is. This makes it possible to determine a second y correction value $K_y2$, which additionally takes into consideration the bowing of the strip. This allows an even more exact correction of the coordinates of the cutting path.

According to an advantageous embodiment, the method comprises the following other steps:

Providing a third y measurement device to measure the third y coordinate y3 of the metal strip with respect to the y reference, the third y measurement device being arranged at the predetermined second distance dx2 downstream of the second y measurement device.

The proposed arrangement of a first, second, and third y measurement device one after the other in the transport direction, each at a defined first distance dx1 and second distance dx2, can, especially in combination with the first displacement measurement device determine the exact position of a point on the metal strip and its change in position after the metal strip moves by the first distance dx1 and the second distance dx2.

A second aspect of the invention proposes a method for correcting a predetermined cutting path for cutting a metal blank from a metal strip continuously transported in a transport direction x, with the following steps:

Simultaneously determining a first x coordinate x1 and a first y coordinate y1 of a first point on a surface of the metal strip with respect to an x and a y reference by means of a strip flow measuring device;

Simultaneously determining a second x coordinate x2 and a second y coordinate y2 of the first point of the surface of the metal strip with respect to the x and y reference by means of the strip flow measuring device, if the metal strip has been moved in the transport direction x by a predetermined third distance dx3;

Determining a third y correction value $K_y3$ using a vector determined by the strip flow measuring device from the coordinate pairs x1y1 and x2y2; and Using the third y correction value $K_y3$ to correct the cutting path coordinates describing the predetermined cutting path.

According to the second aspect of the invention, at least one point of a surface of the metal strip, i.e., a point on the surface formed by the material of the metal strip, is observed. The point can be, e.g., an optically detectable height and/or material anomaly. The positional coordinates x1y1 of the point with respect to the x and y reference are simultaneously determined by means of a strip flow measuring device. At a later point in time, namely if the metal strip has been moved in a transport direction by a predetermined third distance dx3, the second positional coordinates x2y2 of the point with respect to the x and y reference are determined. A vector is then determined from the previously mentioned coordinate pairs x1y1 and x2y2. On the basis of the vector, a third y correction value $K_y3$ is then calculated, with which the cutting path coordinates describing the predetermined cutting path are finally corrected. The proposed determination of a vector allows rapid calculation of the third y correction value and rapid correction of the cutting path coordinates. The vector can be repeatedly calculated with a high clock frequency. This allows rapid and especially precise correction of the cutting path coordinates.

According to an advantageous embodiment, the second aspect of the method comprises the following other steps:

Measuring a fourth y coordinate y4 of the metal strip by means of a fourth y measurement device arranged at a predetermined fourth distance dx4 from the strip flow measuring device and dynamic correction of the third y correction value $K_y3$ using the fourth y coordinate y4.

Measurement of the fourth y coordinate y4 makes it possible to detect bowing of the metal strip, in particular a radius of the bowing. This allows dynamic correction of the third y correction value $K_y3$ taking into consideration the bowing of the metal strip. This allows an especially exact correction of the cutting path coordinates describing the cutting path.

According to another advantageous embodiment, a fourth x coordinate x4 of the metal strip is measured by means of a second displacement measurement device and the fourth x coordinate x4 is used for dynamic correction of the third y correction value $K_y3$. This allows especially exact determination of the fourth distance dx4 and thus especially exact determination of the fourth y coordinate y4.

The first coordinate pair x1y1 is advantageously determined from a surface structure detected at a time point t1 with the strip flow measuring device. The surface structure can be determined from a two or three-dimensional surface image produced at time point t1. The second coordinate pair x2y2 can be calculated from another surface structure detected with the strip flow measuring device at a second time point t2 following the time point t1. Comparing the surface structure detected at time point t1 with another surface structure detected later makes it possible to determine the change in position of the point P. The change in position of the point P can be described by a vector with the starting coordinates x1y1 and the ending coordinates x2y2. The vector can be determined, in particular, according to the image correlation method.

The surface image can be produced using a strip flow measuring device, which comprises one of the following components: A camera, preferably an optical mouse sensor, an optical motion sensor, a distance sensor, preferably a confocal chromatic distance sensor, or a drag wheel with an angle transmitter. The previously mentioned strip flow measuring devices allow the positional coordinates xy of the point P and their change over time or travel to be determined, this determination being required for the inventive method.

The point can be located on a strip edge, an edge of a cut, or a top or underside of the metal strip. According to the first aspect of the invention, the point is advantageously located on a strip edge, and according to the second aspect of the invention, it is advantageously located on a top of the metal strip.

Sample embodiments of the invention are explained in detail below using the drawings. The figures are as follows.

In FIG. 1 through 4, reference number 1 designates a metal strip that is continuously transported in a transport direction x. Reference number 2 generally designates a frame of an apparatus that can comprise conveyor belts, transport rollers, a roller straightening machine, or something similar to transport the metal strip 1 (not shown here). The section of the device shown in den FIG. 1 through 4 has, arranged downstream of it, a laser cutting apparatus (not shown here) for cutting the metal strip 1 into sheet metal blanks with a predetermined geometry. The laser cutting apparatus conventionally comprises one or more lasers, each of which can be moved in the transport direction x and in a transverse direction y running perpendicular to the transport direction x. To move each of the lasers in the x and y-direction, it is possible to provide electrical servo motors, for example. To control such servo motors, a computer is usually provided, which stores cutting path coordinates describing a predetermined cutting path for moving each of the lasers. The cutting path coordinates describe a cutting path with respect to a midplane of the apparatus, i.e., for example, a midplane M of the frame 2, this midplane M running in the xy direction.

In practice, it happens that when the metal strip 1 is being transported the strip middle BM does not coincide with the midplane M of the cutting apparatus. In this case, it can happen that the predetermined cutting path extends beyond the edge of the metal strip 1, and consequently the metal blank does not have the predetermined geometry. To counteract this, the cutting path coordinates describing the cutting path are constantly corrected according to the inventive method so that they relate to the actual position of the strip middle BM.

Figure 1:
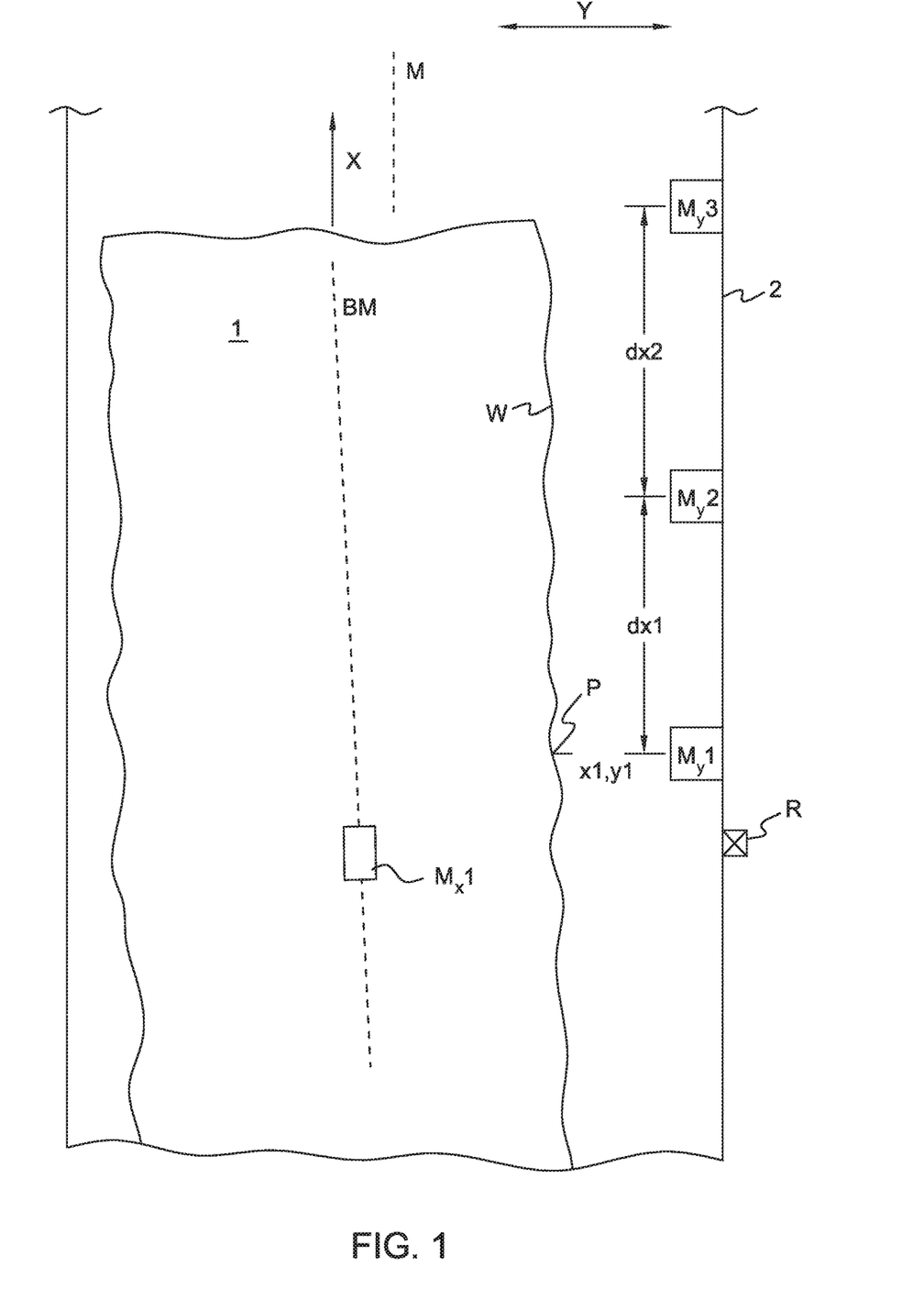
FIG. 1 Determination of the first positional coordinates x1y1 of the point P.
Figure 2:
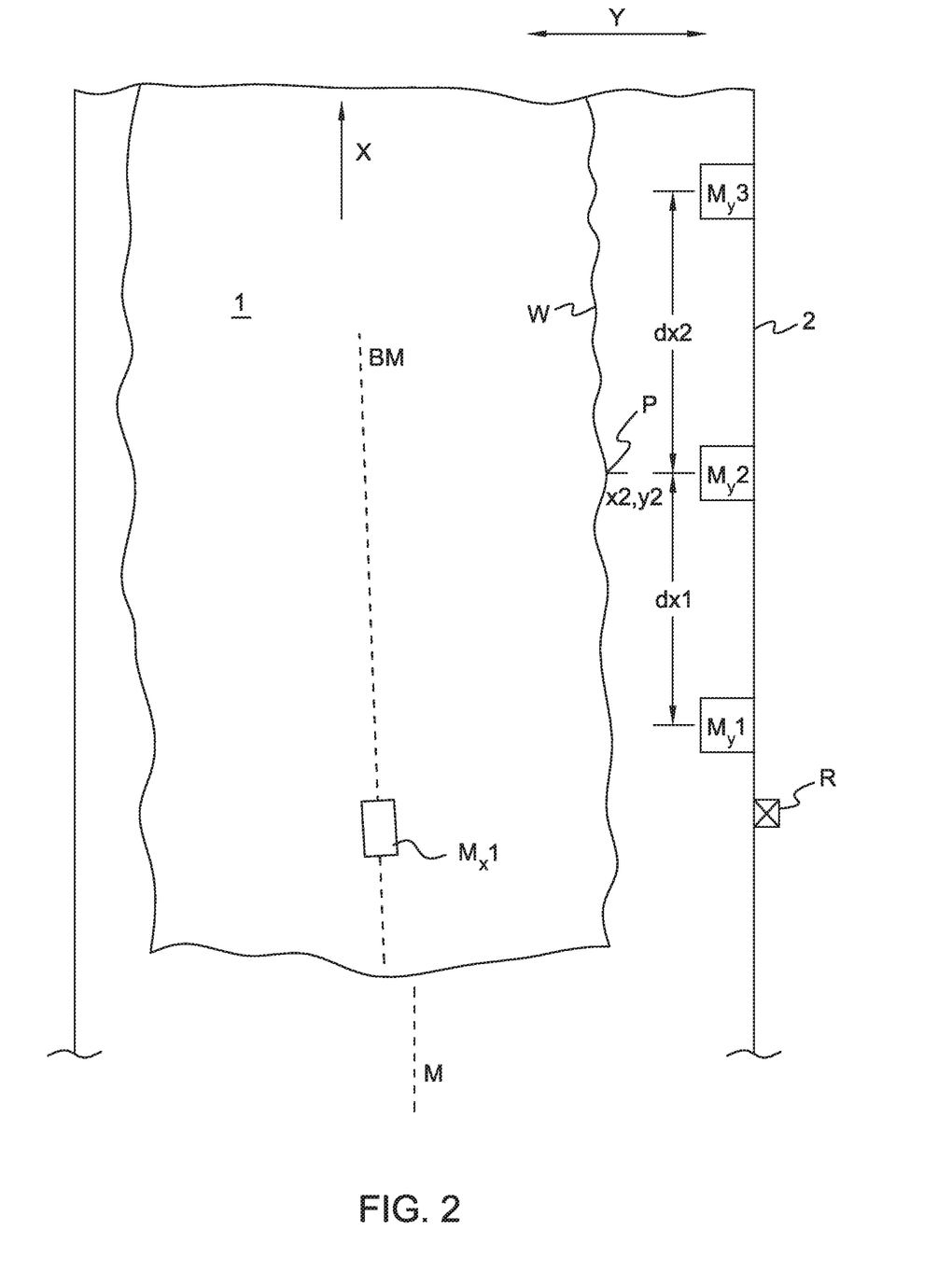
FIG. 2 Determination of the second positional coordinates x2y2 of the point P.
Figure 3:
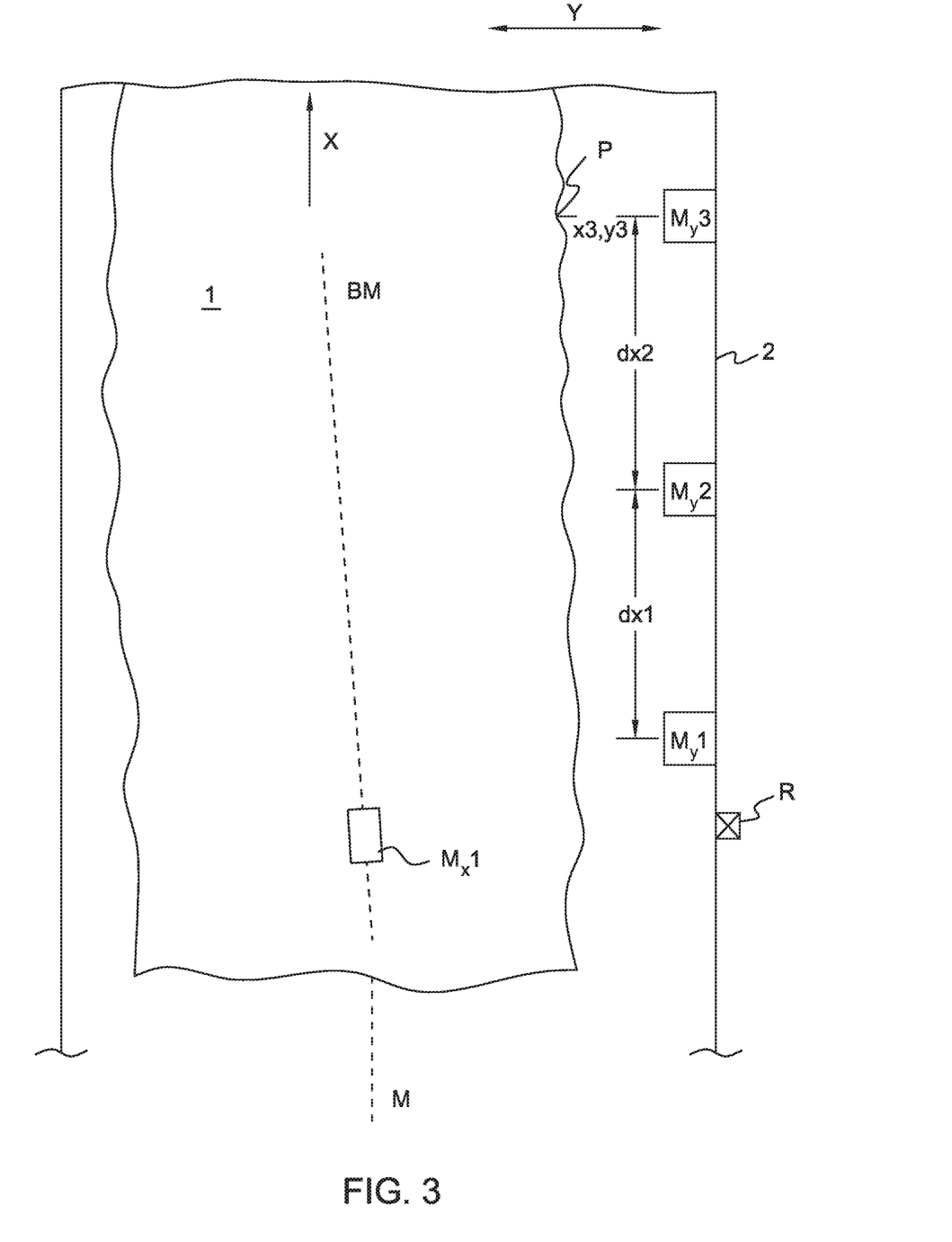
FIG. 3 Determination of the third positional coordinates x3y3 of the point P.

To accomplish this according to a first variant of the method, which is schematically shown in FIG. 1 through 3, a point P at the one edge of the metal strip 1 can be detected by means of a first y measurement device $M_y1$. The first y measurement device $M_y1$ is used to measure a distance of the point P in the y-direction with respect to a y reference R that is at a fixed position on the frame 2. At the same time, a first displacement measurement device $M_x1$ is used to determine a first x coordinate x1 of the point P with respect to the reference R. The first positional coordinates x1y1 of the point P are stored.

The first y measurement device My1 has, arranged at a first distance dx1 downstream of it, a second y measurement device My2. As soon as the first displacement measurement device $M_x1$ detects that the metal strip 1 has moved by the distance dx1 in the transport direction x, the second y measurement device $M_y2$ is used to determine a second y coordinate y2 from the distance to the edge of the metal strip 1. Consequently, the first positional coordinates x1y1 and the second positional coordinates x2y2 always describe the exact position of the same point P on the edge of the metal strip 1.

As can be seen from FIG. 1 through 4, the edge of the metal strip 1 has an edge waviness W. By observing the change in position of one and the same point P, which is possible by simultaneously detecting the respective x and y coordinates, the danger of an inaccuracy in the determination of the correction due to the edge waviness W is avoided.

The difference between the first y1 and the second y coordinate y2 can be used to determine a first y correction value $K_y1$. The first y correction value $K_y1$ can be used to correct the y coordinates of the cutting path coordinates.

Comparison of the first y coordinate y1 and the second y coordinate y2 can determine a misalignment of the strip middle BM with respect to the midplane M, and correct it. By contrast, it is not possible to recognize whether the metal strip 1 has bowing, i.e., a curvature with a large radius. To detect such bowing, it is possible to provide a third y measurement device $M_y3$ at a second distance dx2 downstream of the second y measurement device $M_y2$. It is advantageous if:

$$dx1 = dx2$$

In this case it is possible to operate the first displacement measurement device $M_x1$ and the y measurement devices $M_y1$, $M_y2$, and $M_y3$ at the same clock cycle.

As soon as the first displacement measurement device $M_x1$ has found that the metal strip 1 has moved by the second distance dx2 in the transport direction x, the third y measurement device $M_y3$ determines a third y coordinate y3 by measuring the distance of the point P to the third y measurement device $M_y3$. The difference between the second y coordinate y2 and the third y coordinate y3 is compared with the difference between the first y coordinate y1 and the second y coordinate y2, and this comparison can determine whether there is bowing. Furthermore, it can determine its direction and its magnitude. Let $$y1 - y2 = \Delta 1$$

$$y2 - y3 = \Delta 1$$

The metal strip 1 does not have bowing if:

$$\Delta 1 = \Delta 2$$

By contrast, it does have bowing if:

$$\Delta 1 \neq \Delta 2$$

The difference $$\Delta 1 - \Delta 2 = \Delta 3$$

can be used to infer the radius of the bowing. In addition, the direction of the bowing or curvature of the edge of the metal strip 1 can be inferred from the sign of the difference Δ3.

The previously mentioned relationships apply if dx1=dx2. If dx1 is not equal to dx2, the previously mentioned relationships must be adapted using a factor resulting from the ratio of dx1 and dx2.

Figure 4:
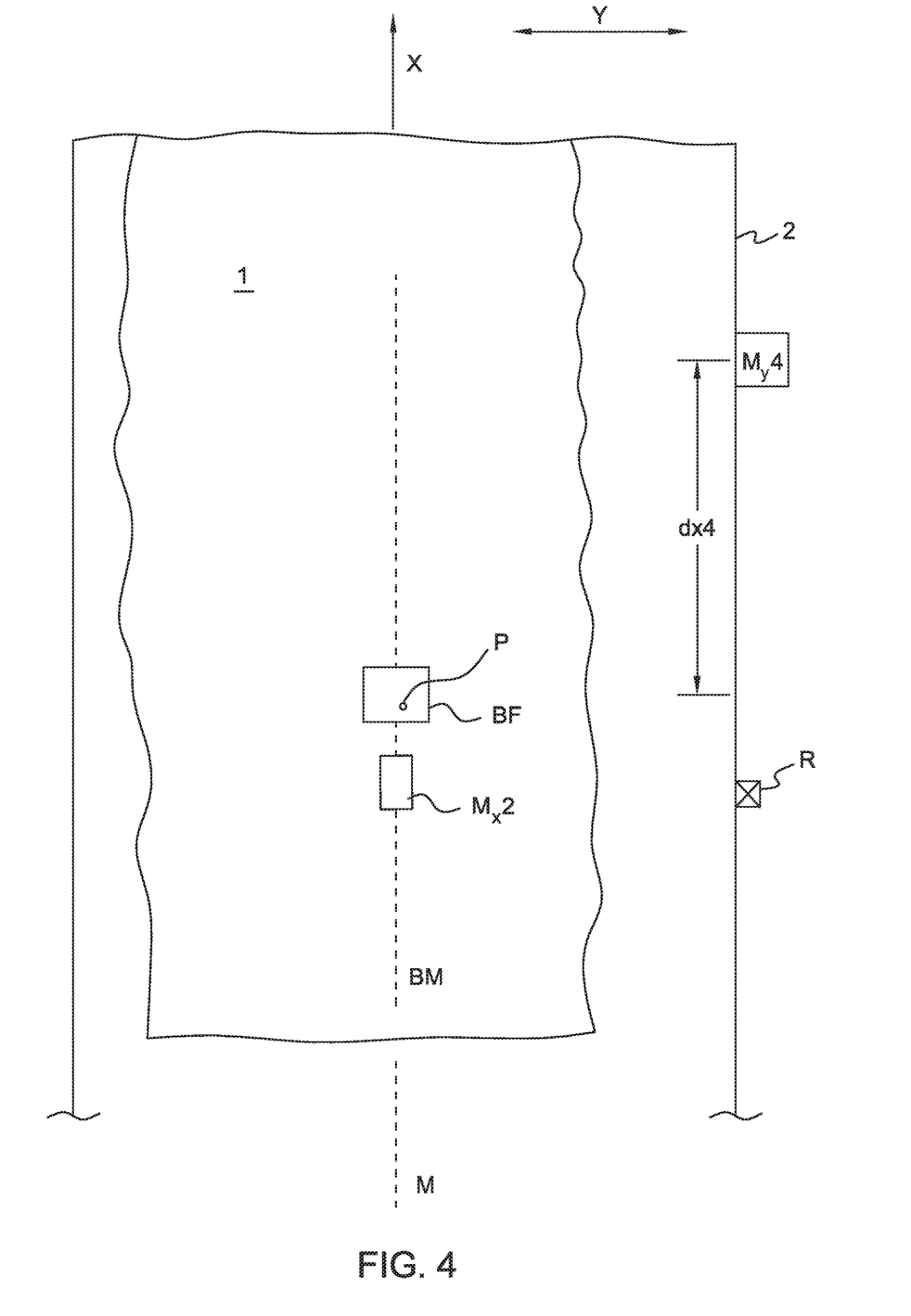
FIG. 4 A schematic view of a measurement arrangement for determination of the positional coordinates according to the second aspect of the invention.
Figure 5:
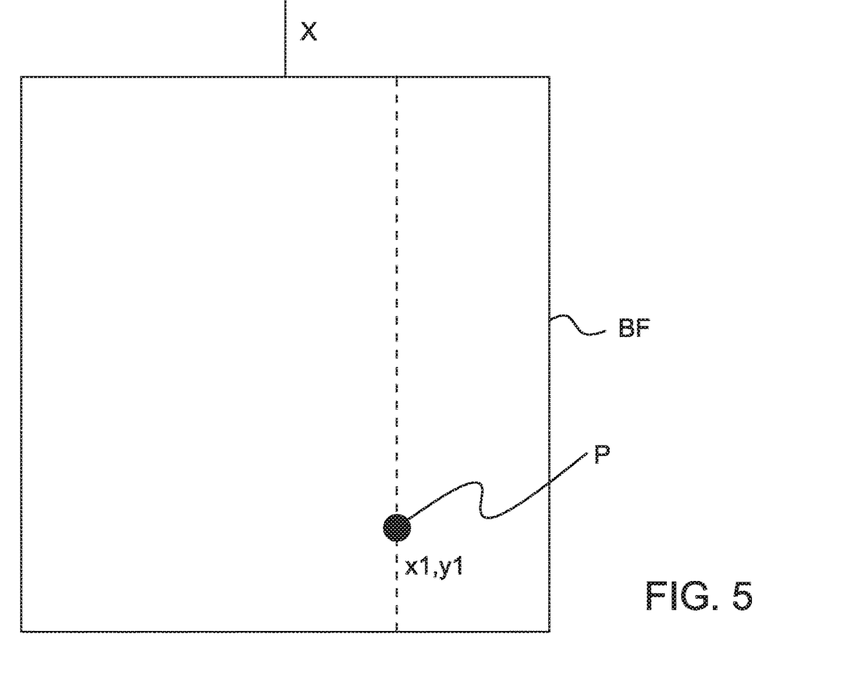
FIG. 5 Determination of the first positional coordinates x1y1 by means of the strip flow measuring device according to FIG. 4.
Figure 6:
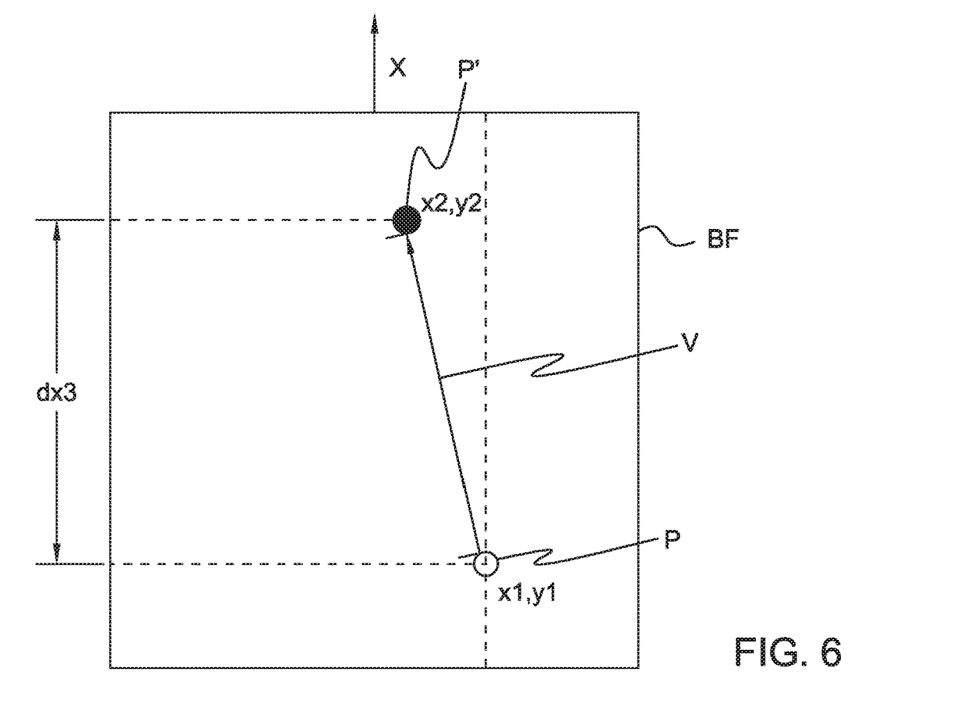
FIG. 6 Determination of the second positional coordinates x2y2 by means of the strip flow measuring device according to FIG. 4.

FIG. 4 through 6 schematically show a second variant of the inventive method. In these figures, a second displacement measurement device $M_x2$ is arranged upstream of a strip flow measuring device labeled with the reference number BF.

FIGS. 5 and 6 schematically show the function of the strip flow measuring device BF. The strip flow measuring device BF can be, for example, a device that is designed similarly to an optical mouse sensor. A camera, for example a 18×18 CCD, is used to capture a surface structure of the surface of the metal strip 1, the surface structure containing the point P. The point P can be, for example, an excavation on the surface of the metal strip 1, which appears dark in the picture captured by the camera. If the metal strip 1 has been moved by a distance dx3 in the transport direction x, the camera takes another picture of the surface structure of the metal strip 1. The second positional coordinates x2y2 of the point are determined. An image correlation process or something similar can then be used to determine the vector V, which describes the speed and the direction of movement of the point P.

To increase the accuracy of determination of the vector V, it is possible to take not only two pictures of the surface structure that contain the point P, but rather multiple pictures. The third distance dx3 is, for example, 0.1 to 3.0 mm. Nevertheless, a first coordinate pair x1y1 and a second coordinate pair x2y2 are defined with the vector.

In particular, from the vector V, it is possible to determine, using conventional calculation methods, the coordinate pairs x1y1 and x2y2, and from them it is in turn possible to determine the third y correction value $K_y3$. The second aspect of the invention to determine the bowing of the metal strip can also, similar to the first aspect of the invention, involve providing a fourth y measurement device My4 at a fourth distance dx4 downstream of the strip flow measuring device BF. The fourth y measurement device My4 can be used to determine a fourth y coordinate y4 to correct the third y correction value Ky3. With the fourth y measurement device $M_y4$ the position, for example of the strip edge of the metal strip 1, can constantly be measured and from this a drift in the y values can be determined. Using the measured drift, the third y correction value $K_y3$ determined by means of the strip flow measuring device BF can be dynamically corrected, if the fourth distance dx4 is known.

LIST OF REFERENCE SIGNS

1 Metal strip
2 Frame
BF Strip flow measuring device
BM Strip middle
dx1 First distance
dx2 Second distance
dx3 Third distance
dx4 Fourth distance
$K_y1$ First y correction value
$K_y2$ Second y correction value
$K_y3$ Third y correction value
M Midplane
$M_x1$ First displacement measurement apparatus
$M_x2$ Second displacement measurement apparatus
$M_y1$ First y measurement apparatus
$M_y2$ Second y measurement apparatus
$M_y3$ Third y measurement apparatus
$M_y4$ Fourth y measurement apparatus
P Point
R Reference
V Vector
W Edge waviness
x1y1 First pair of coordinates
x2y2 Second pair of coordinates
y1 First y coordinate
y2 Second y coordinate
y3 Third y coordinate
y4 Fourth y coordinate

The invention claimed is:

1. A method for cutting a metal blank from a metal strip continuously transported in a transport direction x, comprising:
   preparing a laser cutting apparatus comprising at least one laser moving in a transport direction x and in a transverse direction y running perpendicular to the transport direction x, and a computer storing cutting path coordinates describing a predetermined cutting path for moving the at least one laser;
   simultaneously determining a first x coordinate x1 and a first y coordinate y1 of an arbitrary point on a surface of the metal strip with respect to an x and a y reference, the arbitrary point not being a separate mark put on the metal strip;
   determining a second coordinate y2 of the point with respect to the y reference precisely when the metal strip has been moved in the transport direction x by a predetermined first distance dx1 with respect to the first x coordinate x1;
   determining a first y correction value $K_y1$ by taking a difference between the first y coordinate y1 and the second y coordinate y2;
   using the first y correction value $K_y1$ to correct cutting path coordinates describing the predetermined cutting path; and
   cutting the metal blank by moving the at least one laser along the predetermined cutting path corrected by the first y correction value $K_y1$ while the metal strip is continuously transported in the transport direction x.

2. The method according to claim 1, further comprising:
   providing a first y measurement device ($M_y1$) to measure the first y coordinate y1 of the metal strip with respect to the y reference;
   providing a second y measurement device ($M_y2$) to measure the second y coordinate y2 of the metal strip with respect to the y reference, the second y measurement device ($M_y2$) being arranged at the predetermined first distance dx1 downstream of the first y measurement device ($M_y1$); and
   providing a first displacement measurement device ($M_x1$) to measure the x coordinates of the metal strip with respect to the x reference.

3. The method according to claim 1, further comprising:
   determining a third y coordinate y3 at a predetermined second distance dx2 from a place of determination of the second y coordinate y2;
   determining a second y correction value $K_y2$ by taking a difference between the second y coordinate y2 and the third y coordinate y3; and
   correcting the cutting path coordinates describing the predetermined cutting path by taking into consideration change in the second y correction value $K_y2$ with respect to the first y correction value $K_y1$ over the transport path or over time.

4. The method according to claim 3, further comprising: providing a third y measurement device ($M_y3$) to measure the third y coordinate y3 of the metal strip with respect to the y reference, the third y measurement device being arranged at the predetermined second distance dx2 downstream of the second y measurement device ($M_y2$).

5. The method according to claim 1, wherein in the step of simultaneously determining the first x coordinate x1 and the first y coordinate y1 of the arbitrary point, one point on the surface of the metal strip is detected as the arbitrary point, and the one point is a part of the surface of the metal strip.

6. The method according to claim 1, wherein in the step of simultaneously determining the first x coordinate x1 and the first y coordinate y1 of the arbitrary point, the arbitrary point is not physically marked on the metal strip.

7. A method for cutting a metal blank from a metal strip continuously transported in a transport direction x, comprising:
preparing a laser cutting apparatus comprising at least one laser moving in a transport direction x and in a transverse direction y running perpendicular to the transport direction x, and a computer storing cutting path coordinates describing a predetermined cutting path for moving the at least one laser;
simultaneously determining a first x coordinate x1 and a first y coordinate y1 of an arbitrary point (P) of a surface of the metal strip with respect to an x and a y reference, the arbitrary point not being a separate mark put on the metal strip, this determination being done by means of a strip flow measuring device (BF), which allows a determination of positional coordinates xy of the point and their change over time or travel;
simultaneously determining a second x coordinate x2 and a second y coordinate y2 of the point (P) of the surface of the metal strip with respect to the x and y reference by means of the strip flow measuring device (BF), if the metal strip has been moved in the transport direction x by a predetermined third distance dx3;
determining a third y correction value $K_y3$ using a vector (V) determined by the strip flow measuring device (BF) from coordinate pairs (x1, y1) and (x2, y2);
using the third y correction value $K_y3$ to correct cutting path coordinates describing the predetermined cutting path; and
cutting the metal blank by moving the at least one laser along the predetermined cutting path corrected by the third correction value $K_y3$ while the metal strip is continuously transported in the transport direction x.

8. The method according to claim 7, further comprising: measuring a fourth y coordinate y4 of the metal strip by means of a fourth y measurement device ($M_y4$) arranged at a predetermined fourth distance dx4 from the strip flow measuring device (BF) and correcting the third y correction value $K_y3$ using the fourth y coordinate y4.

9. The method according to claim 7, further comprising: measuring a fourth x coordinate x4 of the metal strip by means of a second displacement measurement device ($M_x2$) and using the fourth x coordinate x4 for correction of the third y correction value $K_y3$.

10. The method according to claim 7, wherein the first coordinate pair (x1, y1) is determined from a surface structure detected at a time point t1 with the strip flow measuring device (BF).

11. The method according to claim 10, wherein the surface structure is determined from a 2- or 3-dimensional surface image produced at time point t1.

12. The method according to claim 11, wherein the surface image is produced using a strip flow measuring device (BF), which comprises one of the following components: a camera, an optical mouse sensor, a distance sensor, or a confocal chromatic distance sensor.

13. The method according to claim 10, wherein the second coordinate pair (x2, y2) is calculated from another surface structure detected at other time points to following the time point t1 with the strip flow measuring device (BF).

14. The method according to claim 7, wherein in the step of simultaneously determining the first x coordinate x1 and the first y coordinate y1 of the arbitrary point, one point on the surface of the metal strip is detected as the arbitrary point, and the one point is a part of the surface of the metal strip.

* * * * *